(No Model.)
D. SIDDALL.
DENTAL ELEVATOR.
No. 427,275. Patented May 6, 1890.
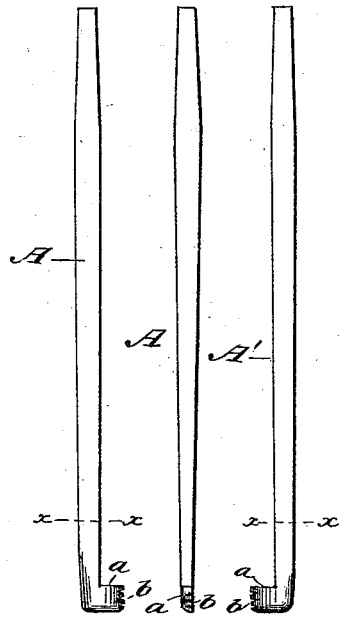
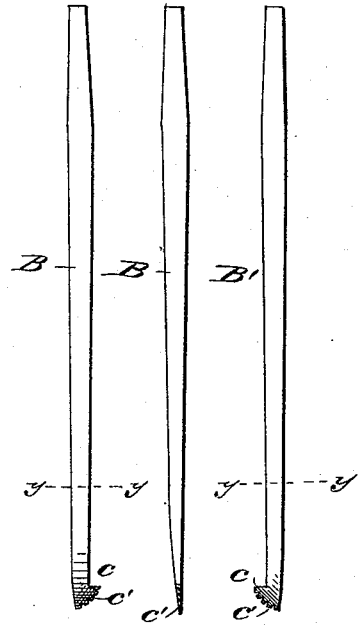
   
WITNESSES:
F. McArdle.
C. Sedgwick.
INVENTOR:
D. Siddall
BY Munn & Co.
ATTORNEYS.

UNITED STATES PATENT OFFICE.

DANIEL SIDDALL, OF THE DALLES, OREGON.

DENTAL ELEVATOR.

SPECIFICATION forming part of Letters Patent No. 427,275, dated May 6, 1890.

Application filed December 9, 1889. Serial No. 333,026. (No model.)

*To all whom it may concern:*

Be it known that I, DANIEL SIDDALL, of The Dalles, in the county of Wasco and State of Oregon, have invented a new and Improved Dental Elevator, of which the following is a full, clear, and exact description.

My invention relates especially to that class of dental instruments known as "dental elevators" or "stump-extractors," which ordinarily comprise a shank having a lateral bend concaved or pronged at its outer end.

The invention will first be described and then specifically claimed.

The elevators are made rights and lefts, so that the convex bearing-surface may always be next the gum of the patient, to avoid bruising or lacerating the flesh, or next the jaw-bone or an adjoining tooth, and may be made in several sizes.

Reference is to be had to the accompanying drawings, forming a part of this specification, in which similar letters of reference indicate corresponding parts in all the figures.

Figure 1 is a side elevation of a right and left instrument, and also a front elevation of one of the instruments. Fig. 2 is the same view of a modification of the device. Fig. 3 is a cross-section on the line $xx$ of Fig. 1, and Fig. 4 a cross-section on the line $yy$ of Fig. 2.

The instruments A A' B B' are all made with long shanks, so that they may be easily operated in the mouth of a patient, and are adapted to be slipped into a handle when they are to be used.

The shank of the elevator A is provided with a laterally-extending end $a$, one side of which is flat, as shown in Fig. 3, and the other side of which is oval and convex, as shown in the same figure. The outside edge of the part $a$ is provided with serrated teeth $b$, adapted to engage the root of the tooth that is to be extracted. When the elevator is to be used, a handle is applied to its upper end. It is then inserted in the mouth of the patient so that the convex bearing-surface of the laterally-extending end $a$ will come next the gum and the flat side next the root of the tooth, or said convex bearing-surface may be placed against the jaw-bone or an adjoining tooth. By working it in this manner between the root and the gum and then twisting it it will act as a pry. The teeth $b$ will engage the side of the root, and thus raise it entirely free from the gum or sufficiently for it to be extracted by the forceps.

The elevator A' is like the one just described, except that the end $a$ is turned in the opposite direction, thus making the instruments rights and lefts and enabling the operator to choose one that will bring the bearing-surface next the gum of the patient.

In Figs. 2 and 4 I have shown a modification of the device already described. The elevators B and B' are made rights and lefts and are operated like the one already described. They differ from the elevators A and A' in the shape of the lower ends $c$. These ends $c$ are flat upon one side and of an oval convex shape on the other, and their edges are provided with serrated teeth $c'$, which operate like the teeth $b$ of the end $a$ described above. The end pieces $c$, instead of being rectangular in form, like the ends $a$, are fan-shaped and have a curved edge, so that the broad part of the edge or a corner thereof may be brought in contact with the root to be extracted.

In practice it is well to have both of the above-described forms of elevator, and one can be chosen that will fit the root to be extracted.

Having thus described my invention, I claim as new and desire to secure by Letters Patent—

1. A dental elevator or stump-extractor consisting in a shank formed with a laterally-extending projection at one end, one vertical face or the tooth side of the projection being flat and the opposite or gum side being rounded from its inner or shank end to its outer or free end to form a fulcrum-point, the edge at which said flat or rounded sides meet or converge being serrated or toothed, substantially as set forth.

2. A dental elevator or stump-extractor comprising a shank having at one end a projection extending laterally beyond one side edge thereof and formed with a flat vertical face on the tooth side and rounded on its opposite or gum side from its inner or shank end to its outer or free edge to form a fulcrum-point, the edge at which the flat and rounded sides meet or converge being convex and serrated or toothed, substantially as set forth.

DANIEL SIDDALL.

Witnesses:
A. S. MACALLISTER,
JOHN M. MARDEN.